Jan. 6, 1953 W. J. PUGH 2,624,073
METHOD OF MANUFACTURING PLURAL HOSE
Original Filed Aug. 26, 1949
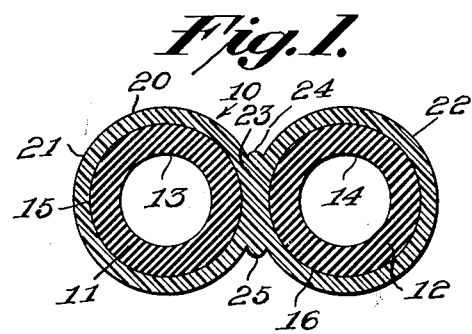
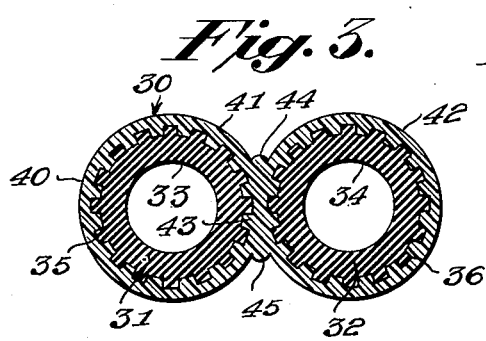
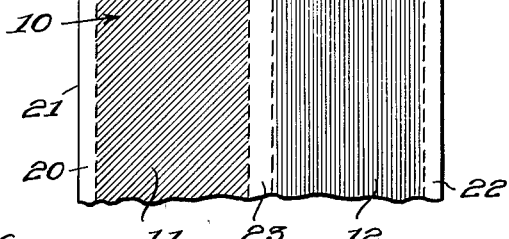
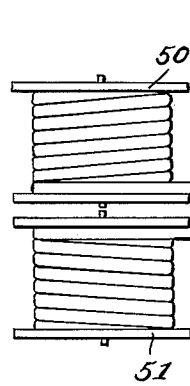
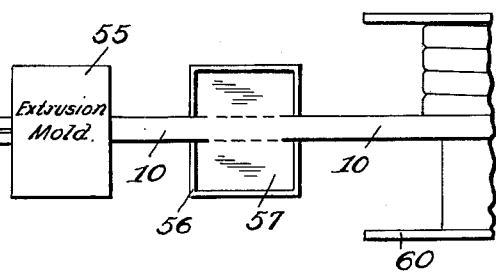
Inventor:
William J. Pugh
A Donham Owen
Attorney Patented Jan. 6, 1953

2,624,073

UNITED STATES PATENT OFFICE 2,624,073

METHOD OF MANUFACTURING PLURAL HOSE

William J. Pugh, Piedmont, Calif.

Original application August 26, 1949, Serial No. 112,475. Divided and this application November 3, 1950, Serial No. 202,633

2 Claims. (Cl. 18—59)

This invention relates to a method of making a plural hose construction. This application is a division of my application Serial No. 112,475, filed August 26, 1949.

It is often desirable to conduct a plurality of fluids from separate sources to a common delivery point. For example, in gas welding the oxygen and acetylene are conducted from their respective supply tanks to the welding torch; a separate conduit is used for each gas, and the mixing is done at the torch. For such uses a plural hose comprising two or more conduits secured together (also called multiple passage hose or twin hose) is preferable to a plurality of single hoses, because the plural hose is handled as a unit without the snarling and tangling encountered where several hoses are used.

All of the types of plural hoses heretofore in use have had serious disadvantages. One type of plural hose has been made by cementing or vulcanizing separate hoses directly to each other. This type has not been able to stand up under use. The separate hoses have come apart under even normal use because the cement or vulcanization could join them over only a small area. They have not been at all satisfactory for conducting gases under high pressure.

A second type of plural hose has comprised separate hoses held together at intervals by metal bands or ferrules. These ferrules have tended to catch on things, and the hoses in between the ferrules have snarled and have got pulled out of alignment. When the ferrules have held the hoses too loosely, they would not stay put. When they have been crimped more firmly around the hoses, they have embedded themselves in the walls of the hoses and have restricted the passageways.

In a third type of plural hose, an outer case has been vulcanized around the inner hoses. The outer case has added a great deal of weight to the combination and has also given rise to serious manufacturing problems. For proper vulcanization of the outer case to the inner hoses, the inner hoses have had to be specially manufactured, and this alone has increased the cost. The inner hoses have then been partially vulcanized. The vulcanization has been completed only when the outer casing has been molded around them. This has meant that only relatively short lengths of the completed hose could be produced in each molding operation. To make long hose has required a number of molding operations, because it has not been possible to manufacture this hose continuously. As a result plural hoses of this type have been very expensive.

A further disadvantage of the vulcanized-case type of twin hose is that it is difficult to separate the hoses, when that is necessary, as it often is, because the outer casing is vulcanized to the inner hoses. Another problem is that it is impossible to tell the two hoses apart except at the ends. Where the inner hoses are made in different colors, identification is possible at the ends where the colors show, but in between the opaque outer hose must be cut away before the colors can be seen.

The present invention solves all of these problems by providing an inexpensive and a simple method for manufacturing plural hoses of the general character above referred to. By the present method the inner hoses are securely linked together, yet they can be separated easily when that is desired. In this invention the outer case is transparent, and when the inner hoses are made in different colors, they can be instantly identified over the whole path of the plural hose. The hose can be produced from standard materials readily available on the market, and only a minimum of special equipment is required. Moreover, they can be made in as long lengths as desired and may be cut to any shorter sizes at the distribution point or at the locus of use. In fact, the plural hose of this invention may be made in a continuous production-line method.

Other objects and advantages of the invention will appear from the following description of a preferred embodiment. A twin hose will be described in accordance with United States Revised Statutes, Section 4888. However, three unit hoses or other types of plural hose may be made in accordance with the principles herein disclosed. Changes in materials, shape, etc., may be made within the scope of these principles, and the particular features have been mentioned for purposes of illustration, not to narrowly limit the invention. The scope of the invention is to be gathered from the appended claims.

In the drawings:

Fig. 1 is an enlarged transverse view in section of a twin hose constructed in accordance with the improved method.

Fig. 2 is a plan view of a portion of the twin hose of Fig. 1; the shading of the inner hoses indicates that the outer surface of one of them has been colored red and the outer surface of the other hose has been colored green. The outer jacket is transparent, and these colored inner tubes can be seen through it.

Fig. 3 is a view similar to Fig. 1 showing a modified form of the invention; and Fig. 4 is a flow chart diagram illustrating the method constituting the invention.

Fig. 1 shows a preferred twin hose 10 produced in accordance with the principles of the invention. As noted, only two hoses 11 and 12 are here used, but more than two could be used to produce a plural hose embodying the same principles.

The inner hoses 11 and 12 may be, and preferably are, hoses which have already been completely fabricated and are available for purchase on the market. They may be composed of rubber, reinforced rubber, rubber and fabric, plastic, rubber and plastic, or any other materials suitable for whatever use the conduits are to be put to. In Fig. 1 they are shown as rubber and they have smooth inner surfaces 13 and 14, and smooth outer surfaces 15 and 16. The outside surfaces 15 and 16, of each of the hoses 11 and 12 may have a different color, so that the hoses 11 and 12 can be told apart. This will aid in identifying the fluid which each of them conducts. Fig. 2 shows the hose 11 as green and the hose 12 as red, though of course they may have any other colors.

The hoses 11 and 12 are enclosed in a jacket 20. Preferably the jacket 20 comprises a transparent, light-weight plastic, so that the colors of the surfaces 15 and 16 may be seen through the jacket. One suitable class of materials from which the jacket 20 may be made is vinyl resin. This substance may be made either clear, opaque, or tinted-transparent, according to the use which the plural hose combination is to be put, but the clear transparent form will usually be preferred.

The jacket 20 constitutes an outer covering joining the two hoses 11 and 12 together. Its shape in cross section conforms to that of the inner hoses 11 and 12. When used for round hoses its appearance in cross-section is characterized by two circular portions 21 and 22 which intersect and are joined together by a center web or membrane 23. Above and below the web 23 the jacket 20 includes integral beads 24 and 25 which strengthen the jacket 20 and help prevent it from being easily torn apart unintentionally. The outside thickness of the jacket may be about 3/64 to 1/8 of an inch thick, and the thickness of the web 23 including the beads 24 and 25 may be about 1/4 of an inch.

The jacket 20 is preferably unitary and seamless, being molded in a plastic extrusion mold. However, the plastic from which the jacket 20 is made is preferably a material which is incompatible with the rubber or plastic from which the hoses 11 and 12 are made, so that no bonding occurs when the jacket 20 is molded. The plastic jacket 20 will shrink when cured and will hold the hoses 11 and 12 tightly without the necessity for bonding. This construction means that the jacket 20 can be severed and cut away wherever desired and the hoses 11 and 12 can then be separated quite easily.

A modified form of twin hose 30 is shown in Fig. 3. Here the two inner tubes 31 and 32 are of a type having corrugations on their outer surfaces 35 and 36, while their inner cylindrical walls 33 and 34 are smooth. The jacket 40 surrounds both tubes 31 and 32 with its two circular portions 41 and 42, connected by the center web 43. There is a bead 44 above the web 43 and a bead 45 below it, to strengthen the juncture. The outer surface of the jacket 40 is smooth, while its inner surface mates with the corrugated surfaces 35 and 36 and fills the spaces between the adjacent ribs. Since the plastic shrinks when cool, the jacket 40 holds the corrugated tubes 31 and 32 very tightly, but it still is not bonded to it, and separation is not a difficult matter.

The preferred method for the manufacture of the twin hose 10 above described is shown in Fig. 4. This method is also applicable to the manufacture of the twin hose 30.

The two inner hoses 11 and 12, have already been completely vulcanized and finished as separate hoses. Very long coils of hoses 11 and 12 may be mounted for free rotation on reels 50 and 51 and unwound therefrom as needed, usually continuously while the plural hose is produced.

The first step is to align the hoses 11 and 12 so that they are adjacent one another but preferably do not quite touch. Then they are passed into an extrusion mold 55 having the desired conformation. There the thermoplastic material (e. g. vinyl resin) is flowed around the hoses 11 and 12 under great pressure and heat and molded around them to form the jacket 20.

From the extrusion mold 55, the twin hose 10 may pass through a tank 56 of water 57, where the jacket 20 is cooled, cured, and shrunk into the final shape. Other curing means may be employed, according to the type of twin-hose 10 desired and the type of plastic employed for the jacket 20. When the hose 10 has been cured, it may be wound on a reel 60 for later distribution in long coils or for later cutting to shorter lengths.

It will be seen that this method provides for the continuous manufacture of twin hose in lengths as long as the single hoses from which they are made. It also should be noted that the single hoses 11 and 12 may be practically any type of finished hose, and the jacket 20 may be made from a variety of suitable materials.

The resultant product 10 will be light in weight, and it will be inexpensive because the hoses 11 and 12 can be standard hoses bought on the market, and the extrusion mold 55 is the only piece of special equipment required. The twin hose 10 is strong, and holds the inner tubes 11 and 12 quite firmly. Since the jacket 20 and tubes 11 and 12 are not bonded together, it is easy to separate the hoses 11 and 12 at the ends or wherever desired between the ends simply by cutting the jacket 20 away. The inner hoses 11 and 12, if differentiated by color, can be identified through the transparent jacket 20 anywhere along the length of the twin hose 10.

I claim:

1. The method for the manufacture of a dual hose having two differently colored rubber hoses joined throughout their length in spaced relationship by a transparent, non-adhering, unitary, plastic connecting jacket comprising the following successive steps: longitudinally aligning two differently colored hoses in uniformly spaced relationship, progressively feeding said longitudinally aligned hoses through an extrusion mold, simultaneously maintaining said uniform transverse relationship and extruding, at an elevated temperature, a relatively thin, unitary connecting jacket of non-adhering, transparent material, plastic at said elevated temperature, completely about said differently colored hoses including the space therebetween, and finally cooling the article so formed sufficiently to bring same to room temperature to contract said unitary connection jacket into firm non-bonded engagement with the outer walls of said rubber hoses.

2. The method of claim 1, in which said transparent, thermo-plastic, non-bonding, contractable material is a vinyl resin.

WILLIAM J. PUGH.

REFERENCES CITED

The following references are of record in the file of this patent:

UNITED STATES PATENTS

| Number | Name | Date |
| --- | --- | --- |
| 1,740,029 | Moomy | Dec. 17, 1929 |
| 2,216,832 | Royle | Oct. 8, 1940 |
| 2,420,221 | Bell | May 6, 1947 |
| 2,476,140 | Francis | July 12, 1949 |